T. G. RICE.
WHEEL RETAINING MEANS.
APPLICATION FILED NOV. 24, 1909.

1,035,907.

Patented Aug. 20, 1912.

WITNESSES:

INVENTOR

T. G. Rice

BY

ATTORNEYS

UNITED STATES PATENT OFFICE.

THOMAS G. RICE, OF WHEELER, NEW YORK, ASSIGNOR OF ONE-FOURTH TO WILLIAM G. DEAN AND ROBERT J. SCOTT, OF PRATTSBURG, NEW YORK.

WHEEL-RETAINING MEANS.

1,035,907.  Specification of Letters Patent.  Patented Aug. 20, 1912.

Application filed November 24, 1909. Serial No. 529,662.

*To all whom it may concern:*

Be it known that I, THOMAS G. RICE, residing at Wheeler, in the county of Steuben and State of New York, have invented certain new and useful Improvements in Wheel-Retaining Means, of which the following is a full, clear, and exact description, such as will enable others skilled in the art to which it appertains to make and use the same.

This invention relates to wheel retaining means and with regard to the more specific features thereof, to axle and hub construction.

One of the objects thereof is to provide simple, practical and reliable means for retaining a wheel on an axle.

Another object is to provide practical and efficient means adapted to lessen the harmful effects upon a wheel and axle of inequalities in the surface traversed thereby.

Other objects will in part be obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
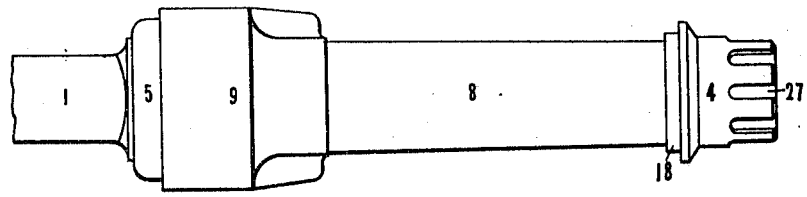
Figure 2:
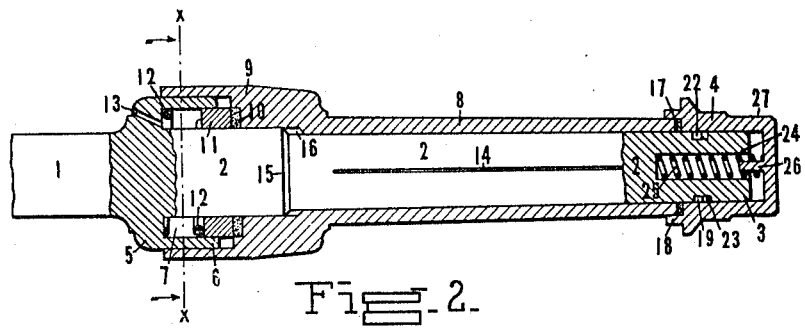
Figure 3:
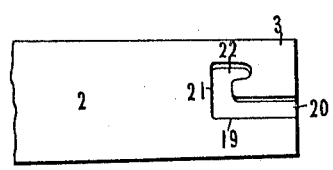
Figure 4:
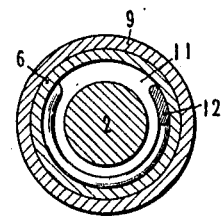

In the accompanying drawings, wherein is shown one of various possible embodiments of this invention; Figure 1 is a plan of an axle and axle-box showing a cap in locked position upon the end of the axle. Fig. 2 is a partial longitudinal cross section of the same. Fig. 3 is a fragmentary view showing, in detail, a feature of the means employed to secure the cap in place upon the axle. Fig. 4 is a cross section taken as indicated by line *x—x* in Fig. 2.

Similar reference characters refer to similar parts throughout the several views of the drawings, wherein—

1 denotes a vehicle axle provided with a bearing surface 2 and a portion 3 extended outwardly beyond the bearing surface and adapted to receive thereon a cap 4. Adjacent the inner end of the bearing surface the axle is provided with a flange 5, a portion 6 of which extends outwardly therefrom, concentrically with the axle, and forms with said axle an annular space 7. An axle-box, 8, designed and proportioned to fit slidingly and rotatively upon the bearing surface of the axle, is provided at its inner end with an enlarged boss 9, which is formed to receive the outwardly projecting portion of the flange 5 and to fit closely thereabout. A shallow counter-bore receives a washer 10 composed of any suitable material adapted to provide a good bearing surface for a loose collar 11, which is normally in contact therewith and proportioned to slide within the annular space 7. Resilient means 12 interposed between the flange 5 and said collar, normally forces the latter, together with the axle-box, outwardly along the axle. An air hole 13 leads through said flange for the purpose of maintaining atmospheric pressure within the space 7 and for the admission of a suitable lubricant to the annular space 7, whence the lubricant flows to all parts of the bearing surface by means of suitable oil grooves 14.

15 is a shoulder provided upon the axle to engage with a corresponding shoulder 16 in the bore of the axle-box and, in conjunction with the end of the forwardly projecting flange 6, serving to limit the inward movement of said box. The cap 4, which is provided to secure the box upon the axle and to limit the movement of the same in an outward direction, is formed to fit closely over the axle extension 3 and to normally abut against the box through the intermediation of a washer 17. An inwardly extending flange 18 takes over the end of the box and serves to exclude dust from the bearing surfaces. Cut in the cylindrical surface of the axle, adjacent the end thereof is a groove or plurality of grooves 19, a longitudinal portion 20, of which extends inwardly from the end of the axle and terminates in a transverse portion 21; and extending outwardly from the opposite end of said transverse portion is a short return portion 22. These several portions constitute a substantially hook shaped groove, the longer portion extending to the end of the axle and the return portion forming a seat for a pin 23 provided interiorly of the cap 4 when the parts are in locked position. One or more of these pins may be provided to accord with the number of grooves upon the axle. The outer end of the axle is recessed, as at 24, to receive resilient means 25, and extending inwardly from the end wall of the cap is a projection 26, adapted to fit within said resilient means to prevent the latter from being displaced or forced out of alinement.

Having described this embodiment of the invention, the operation thereof will be largely obvious.

To assemble the parts, the axle is jacked up and the wheel forced thereon in the usual manner, resilient means 12 and collar 11 having previously been fitted within the annular space 7. The cap 4 is then held so as to enable the pin 23 to enter the outer end of the groove 19 and the cap is pressed inwardly upon the axle until said pin abuts the inner wall of the groove, when the cap is turned into alinement with the return portion thereof and is released, to be immediately forced into seated position against the outer end of said portion by resilient means 25.

It will be seen that in forcing the cap on, the axle-box is carried inwardly therewith, against the tension of resilient means 12 and that said means assists resilient means 25 in seating the cap in locked position. When desired, the cap can be easily and quickly removed by first pressing inwardly and then turning laterally until the pin 23 is in alinement with the longer portion of groove 19.

It will be seen that under no conditions of actual use can the cap come off of its own accord, and further, it is to be noted that if inequalities in the surface of the road exert lateral pressure upon the wheel, the axle-box thereof is free to slide inwardly a short distance against the tension of resilient means 12, and, the cap being prevented from following because of the resistance offered by resilient means 25, uncoupling is impossible. The exterior of the cap may be provided with any suitable means adapted to receive a wrench to aid in the rotative movement necessary to remove it from the axle. In the present embodiment grooves 27 subserve this end.

From the foregoing it will be seen that this invention is well adapted to attain the aims and objects hereinbefore set forth in a practical and efficient manner, and that structurally considered, is of great simplicity, being composed of but few parts, well adapted for being made at a low cost and individually so formed as to be capable of being readily assembled into a neat and compact arrangement for accomplishing the purposes intended.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. In a device of the character described, in combination, an axle provided with a bearing and an end extension outwardly of said bearing, an axle-box slidably and rotatively fitted thereto, a cap adapted to take over said extension, means forming a bayonet joint between said cap and said extension, whereby said cap may be moved inwardly upon said extension, given a partial rotation and moved outwardly to uncouple said parts, resilient means adapted to resist said inward movement, and other resilient means tending to force said box outwardly against said cap.

2. In a device of the character described, in combination, an axle provided with a bearing and an end extension outwardly of said bearing, an axle-box slidably and rotatively fitted thereto, a cap adapted to take over said extension, means forming a bayonet joint between said cap and said extension, whereby said cap may be moved inwardly upon said extension, given a partial rotation and moved outwardly to uncouple said parts, resilient means adapted to resist said inward movement, a flange on said axle adjacent the inner end of said bearing, and resilient means interposed between said flange and said box, adapted to force the latter against said cap and to resistingly permit inward movement of both said parts.

In testimony whereof I affix my signature, in the presence of two witnesses.

THOMAS G. RICE.

Witnesses:
S. B. MERRITT,
T. CHAUNCEY WILLIAMS.

---

Copies of this patent may be obtained for five cents each, by addressing the "Commissioner of Patents, Washington, D. C."